Figure 1:
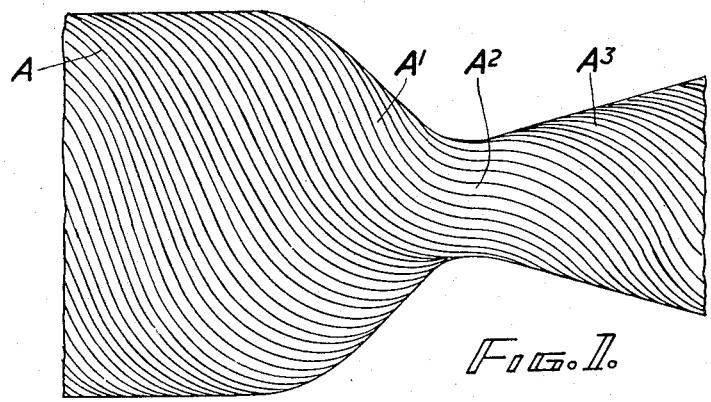

April 7, 1959     F. B. HALFORD ET AL     2,880,577
MULTI-TUBULAR WALL FOR HEAT EXCHANGERS Filed Aug. 22, 1955     2 Sheets-Sheet 1

United States Patent Office 2,880,577
Patented Apr. 7, 1959

2,880,577

MULTI-TUBULAR WALL FOR HEAT EXCHANGERS

Frank Bernard Halford, deceased, late of Northwood, England, by Alfred Hardy Bentley, George Purvis Bulman, and John Hardy Bentley, executors, London, England, and Leonard Stanley Snell, Bedfont, Feltham, England, assignors to The De Havilland Engine Company Limited, Leavesden, England, a British company Application August 22, 1955, Serial No. 529,832

Claims priority, application Great Britain August 30, 1954

9 Claims. (Cl. 60—35.6)

This invention relates to heat exchangers in which the heat exchange surface is or approximates to a surface of revolution of non-uniform radius. The term "heat exchanger" is used in a general sense as meaning anything in which heat is transmitted from one fluid to another fluid through a heat exchange surface which prevents these fluids coming into contact with each other, and includes cases in which the main object is the heating or cooling of the heat-exchange surface itself. A particular example of such a heat exchanger is a rocket motor combustion chamber in which a coolant (which may be one of the propellants or some other fluid) flows outside the combustion chamber wall and cools this wall, which is heated by the hot combustion products within the combustion chamber. Another example is the spinner of an aircraft engine or the nose of an aircraft warmed from behind by a heating fluid to prevent the formation of ice thereon.

In a heat exchanger according to the present invention, the heat exchange surface is, or approximates to, a surface of revolution of non-uniform radius, and is constituted by a plurality of fluid-conducting tubes laid contiguously side by side and so held together as to form a wall.

In order that tubes can lie contiguously side by side over all parts of the surface they will generally have a rather complex curvature, but it is nevertheless possible to design them so that the requirement will be satisfied. The limiting forms of a surface of revolution are, on the one hand a flat disc, and on the other hand a right circular cylinder. On a surface which is a flat disc the curve of each tube which will satisfy the requirement that the tubes shall remain contiguous over the whole surface is an involute. On a surface which is a cylinder, the curve of each tube which will satisfy this requirement is a helix. On any other form of surface of revolution, the required curvature of the tubes will lie somewhere between an involute and a helix. Since the form of the surface of revolution will in general vary in different zones thereof, the tubes will have a complex but calculable curvature. For any given surface of revolution, the simplest curvature of the tubes will generally be achieved if the tubes are arranged to lie parallel with the axis of the surface of revolution in the zone of smallest radius, but they could lie in any other direction if desired.

The tubes are preferably of circular cross-section but other cross sections may be used if desired, for instance square or sectoral. If circular tubes are used they need only be bent to the required shape and then nested together to form the heat-exchange surface, but tubes of other than circular shape need to be twisted in addition to being bent.

A typical example of the invention and various modifications thereof are illustrated somewhat diagrammatically by way of example in the accompanying drawings as applied to a heat exchanger forming the combustion chamber of a rocket motor having an external surface of compound curvature.

Figure 2:
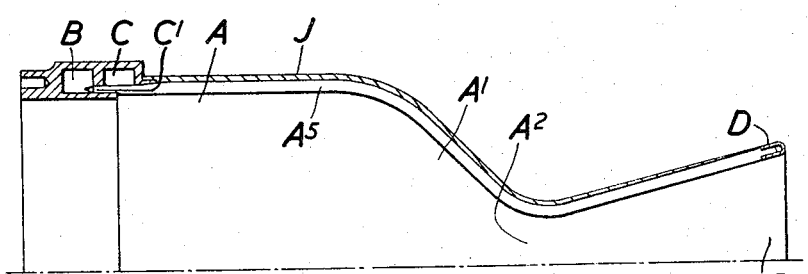
Figure 3:
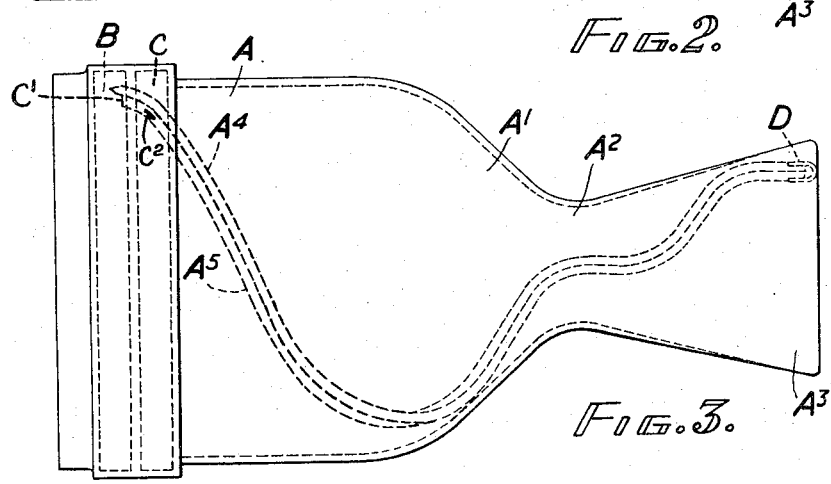
Figure 4:
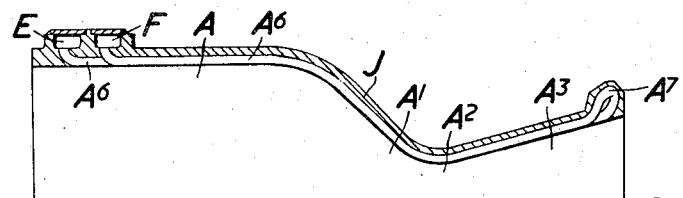
Figure 5:
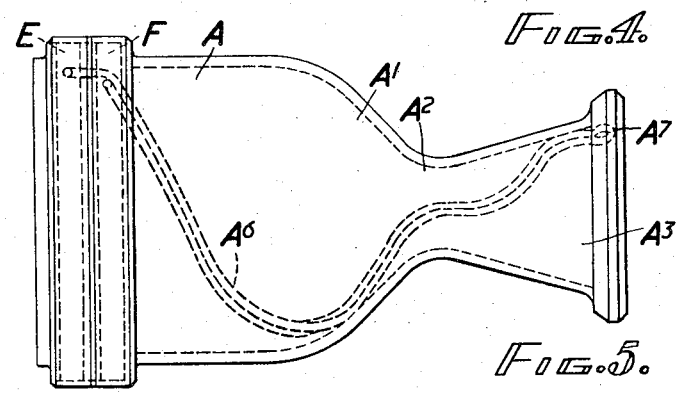
Figure 6:
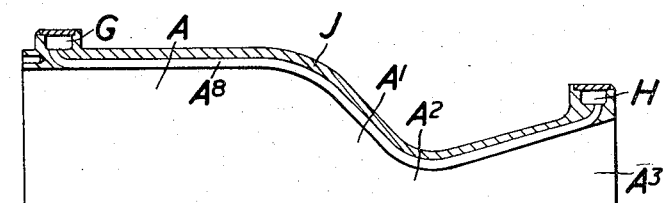
Figure 7:
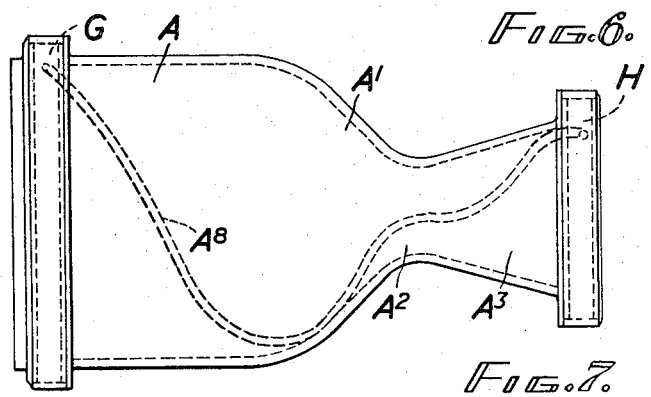

In the accompanying drawings:

Figure 1 shows diagrammatically part of the combustion chamber wall of a rocket motor in accordance with the invention indicating the general shape of the tubes constituting that wall, Figure 2 is a part-cross-section in a plane containing the axis of the combustion chamber of a rocket motor constructed as shown in Figure 1 showing one arrangement by which the flow of fluid into and out of the tubes arranged as shown in Figure 1 can be achieved, Figure 3 is a side elevation of the combustion chamber of a rocket motor constructed in accordance with Figure 2 but showing, for ease of illustration and in dotted lines, the general form of one pair of adjacent tubes only, Figure 4 is a similar view to Figure 2 of an alternative arrangement providing for flow of fluid into and out of the tubes of an arrangement as shown in Figure 1, Figure 5 is a similar view to Figure 3 of the arrangement shown in Figure 4, and Figures 6 and 7 are similar views rerspectively to Figures 2 and 3 of the combustion chamber of a rocket motor having a still further arrangement providing for flow of fluid into and out of the tubes.

In the construction as shown in Figure 1 it will be apparent that the combustion chamber comprises a cylindrical part A, a frusto conical part $A^1$ leading to a throat $A^2$, and a final part $A^3$ constituting an expanding nozzle or a jet pipe through which the products of combustion are ejected with propulsive effect and that the tubes of which the combustion chamber wall are formed change their angle of helix in accordance with the diameter of the part of the combustion chamber which they are forming. Thus over the cylindrical part A the tubes have a substantially constant comparatively small helix angle, this angle increases progressively as the tubes traverse the frusto conical part $A^1$ towards the throat $A^2$, the tubes extend in a direction substantially parallel to the axis of the combustion chamber at the throat $A^2$ (that is to say the helix angle is substantially 90° at this point) after which the helix angle again progressively decreases as the tubes pass from the throat $A^2$ along the expanding nozzle section $A^3$.

In the constructional form diagrammatically illustrated in Figures 2 and 3 the tubes are arranged in pairs, one tube $A^4$ of each pair communicating at its forward end with a header chamber B while the other tube $A^5$ of each pair is closed at its extreme forward end as by being flattened at $C^1$ and provided with an aperture $C^2$ by which it communicates at its forward end with a header chamber C, the rear ends of the two tubes $A^4$ and $A^5$, wnich follow the path indicated in Figure 3, communicating with a common connecting cup or the like indicated generally at D.

In the modified arrangement shown diagrammatically in Figures 4 and 5 each tube $A^6$ extends from an inlet header chamber E at the forward end of the combustion chamber to the rear end of the nozzle and is then bent as shown at $A^7$ back upon itself to the forward end of the combustion chamber where it communicates with an outlet header chamber F. The arrangement is thus generally similar to that shown in Figures 2 and 3 except that the wall of the combustion chamber instead of being built up of pairs of separate tubes with each pair communicating at their rear ends with one another through a connecting cup is built up of single tubes bent back upon themselves.

In the still further modified arrangement diagrammatically illustrated in Figures 6 and 7 each tube $A^8$ extends between a header chamber G at the forward end of the combustion chamber and a header chamber H at the rear end of the nozzle section $A^3$.

It will be understood that the curved form of each tube constituting part of a heat exchanger according to the invention will vary with the form of the heat exchange wall of which that tube forms part. Thus the limiting forms of the surface of revolution are on the one hand a flat disc and on the other hand a right circular cylinder. On a surface which is a flat disc the curve of each tube which would satisfy the requirements that the tubes shall remain contiguous over the whole surface is an involute while for a surface which is a right cylinder the curvature of each tube which will satisfy this requirement is a constant angle helix.

In each of the constructions illustrated it will be apparent that the nest of tubes forming the wall of the combustion chamber is enclosed within a pressure resisting casing J. On the other hand in cases where there is not a large pressure difference to be resisted, such a pressure resisting case may be dispensed with, the tubes being all joined together along their lengths by welding, brazing or the like.

The cross-sectional area of each tube in a heat exchange wall according to the invention may be constant throughout its length, or its internal cross-sectional area may vary progressively over a part of the whole of its length. In the latter case the outside cross section of each tube may be constant throughout its length and the thickness of the tube vary in accordance with the variation in the internal cross-sectional area, or the outside cross section of the tube may vary in accordance with the variation in its internal cross-sectional area.

Such an arrangement may be of particular advantage where the cross sectional area of the passage constituted by the surface of revolution varies, in which event the part of each tube which is of minimum internal cross-sectional area will preferably lie adjacent to the part of such passage which is of minimum cross-sectional area and through which therefore the velocity of fluid flow is highest. Thus in the forms of combustion chamber shown in the drawings, the part of each tube which is of minimum internal cross-sectional area would coincide approximately with the throat $A^2$.

What we claim as our invention and desire to secure by Letters Patent is:

1. A heat exchange wall constituting the wall of the combustion chamber of a rocket motor and having a surface which is or approximates to a surface of revolution about the longitudinal axis of the chamber and includes a throat portion of minimum diameter leading to an expanding nozzle for the gases produced therein in which the said wall comprises a plurality of liquid conducting tubes laid contiguously side by side and extending in parallel between inlet and outlet liquid holding chambers encircling said combustion chamber, the tubes lying approximately parallel to the axis of the combustion chamber at the said throat and being elsewhere of helical form.

2. A heat exchange wall as claimed in claim 1 in which the tubes are arranged in pairs, the tubes of each pair lying contiguously and extending respectively from an inlet chamber and an outlet chamber both situated adjacent to the end of the said combustion chamber remote from the said nozzle to a point adjacent to the outlet end of the said nozzle where they communicate with one another.

3. A heat exchanger of tubular form, the side wall of which is of approximately circular cross-section in planes normal to the axis of the heat exchanger and is of non-uniform diameter lengthwise thereof, wherein said side wall comprises a plurality of unitary fluid conducting tubes each of helical form extending lengthwise thereof but with the pitch of the helix of each tube varying throughout the length of the wall inversely as the diameter of the wall varies, the tubes being laid contiguously side by side and united to one another along their contiguous sides forming a wall, so that part of the circumference of each tube forms the inner surface of the heat exchanger side wall and is in direct contact with the heat source, and the parts of the tubes which constitute the part of the wall of minimum diameter extend in a direction which is predominantly parallel to the axis of the heat exchanger.

4. A heat exchanger as claimed in claim 3 in which the tubes extend between a common inlet chamber adjacent to an end of the heat exchanger and a common outlet chamber also adjacent to an end of the heat exchanger.

5. A heat exchanger as claimed in claim 3 in which the tubes are arranged in pairs, the tubes in each pair lying contiguously and extending respectively from an inlet chamber and from an outlet chamber both situated adjacent to one end of the heat exchanger to a point adjacent to the other end of the heat exchanger where the two tubes of the pair communicate with one another.

6. A heat exchanger as claimed in claim 3 in which the internal cross-sectional area of each tube varies progressively over a part of the whole of its length.

7. A heat exchanger as claimed in claim 6 in which the outside cross-section of each tube remains constant and the thickness of the tube varies in accordance with the variation in its internal cross-sectional area.

8. A heat exchanger as claimed in claim 6 in which the outside cross-section of each tube varies in conformity with the variation in its internal cross-sectional area.

9. A heat exchanger as claimed in claim 6 in which the minimum internal cross-sectional area of each tube coincides approximately with the minimum cross-sectional area of the passage constituted by the surface of revolution, that is to say the part of such passage through which the rate of fluid flow is highest.

References Cited in the file of this patent

UNITED STATES PATENTS

| | | |
|---|---|---|
| 1,655,086 | Blanding | Jan. 3, 1928 |
| 1,935,659 | Noack | Nov. 21, 1933 |
| 2,520,751 | Zucrow | Aug. 29, 1950 |
| 2,540,594 | Price | Feb. 6, 1951 |

FOREIGN PATENTS

| | | |
|---|---|---|
| 459,924 | Great Britain | Jan. 18, 1937 |